United States Patent
Moon et al.

(10) Patent No.: US 8,036,294 B2
(45) Date of Patent: Oct. 11, 2011

(54) APPARATUS AND METHOD FOR INTERFERENCE CANCELLATION IN A WIRELESS COMMUNICATION SYSTEM

(75) Inventors: June Moon, Seoul (KR); Soon-Young Yoon, Seoul (KR); Ki-Young Han, Yongin-si (KR); Keun-Chul Hwang, Seongnam-si (KR); Joo-Hyun Lee, Suwon-si (KR); Sung-Soo Hwang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1167 days.

(21) Appl. No.: 11/651,934

(22) Filed: Jan. 10, 2007

(65) Prior Publication Data
US 2007/0183524 A1 Aug. 9, 2007

(30) Foreign Application Priority Data
Jan. 10, 2006 (KR) ........................ 10-2006-0002577

(51) Int. Cl.
*H04L 5/12* (2006.01)
*H04L 23/02* (2006.01)
(52) U.S. Cl. ........................ 375/261; 375/346; 375/316
(58) Field of Classification Search .................. 375/261, 375/346, 316
See application file for complete search history.

(56) References Cited

U.S. PATENT DOCUMENTS

| 7,248,879 | B1 * | 7/2007 | Walton et al. .............. 455/452.2 |
| 7,430,256 | B2 | 9/2008 | Zhidkov |
| 7,555,031 | B2 * | 6/2009 | Chan et al. .................... 375/136 |
| 2006/0115079 | A1 * | 6/2006 | Heiman et al. .................. 380/28 |

FOREIGN PATENT DOCUMENTS
KR 1020050030457 3/2005
* cited by examiner

*Primary Examiner* — David C. Payne
*Assistant Examiner* — Nader Bolourchi
(74) *Attorney, Agent, or Firm* — The Farrell Law Firm, P.C.

(57) ABSTRACT

A symbol demapping method and apparatus for efficient interference cancellation in a wireless communication system. Decision signal points are generated which include decision signal points based on a modulation scheme and a virtual signal point added to a zero point. A magnitude of a complex value of an input signal is compared with a threshold based on system setting. When the magnitude of the complex value is less than the threshold, the virtual signal point of the zero point is mapped and output as a target decision signal point. When the magnitude of the complex value is greater than or equal to the threshold, one of the decision signal points based on the modulation scheme is mapped and output according to the com0plex value.

6 Claims, 6 Drawing Sheets

APPARATUS AND METHOD FOR INTERFERENCE CANCELLATION IN A WIRELESS COMMUNICATION SYSTEM

PRIORITY

This application claims priority under 35 U.S.C. §119(a) to an application filed in the Korean Intellectual Property Office on Jan. 10, 2006 and assigned Serial No. 2006-2577, the disclosure of which is incorporated herein by reference.

BACKGROUND OF THE INVENTION

1. Field of the Invention

The present invention generally relates to a wireless communication system, and more particularly to an apparatus and method for efficient interference cancellation in a wireless cellular system.

2. Description of the Related Art

Technologies used to provide users with data services in current wireless communication environments are classified into $2.5^{th}$ or $3^{rd}$ generation cellular mobile communication technologies such as Code Division Multiple Access 2000 1× Evolution Data Optimized (CDMA2000 1×EVDO), General Packet Radio Services (GPRS) and Universal Mobile Telecommunication Service (UMTS) and wireless Local Area Network (LAN) technologies such as an Institute of Electrical and Electronics Engineers (IEEE) 802.11 wireless LAN and the like.

A distinctive feature of the $3^{rd}$ generation cellular mobile communication technology for providing a voice service via a circuit network is that packet data services are provided to users for accessing the Internet in a broad-band wireless communication environment.

With the development of mobile communication technologies, various LAN wireless access technologies such as an IEEE 802.16 based wireless LAN and the like are appearing. These technologies do not ensure a mobility level equal to that of a cellular mobile communication system. However, the LAN wireless access technologies are being proposed as an alternative plan for providing a high-speed data service in a wireless environment by replacing a wired communication network such as a cable modem or Digital Subscriber Line (xDSL) with a wireless LAN in a home network environment or a hot spot area such as a public place or school.

When the above-described wireless LAN provides high-speed data service, there are limitations in providing users with public network services due to propagation interference as well as very limited mobility and narrow service coverage.

Thus, efforts for overcoming the limitations are being made at various angles. For example, a large amount of research is being conducted on a mobile Internet technology for making up for the weak points of the cellular mobile communication system and the wireless LAN. Moreover, active research is being conducted on a Wireless Broadband Internet (WiBro) system as a representative example of the mobile Internet technology currently being standardized and developed. The WiBro system can provide high-speed data service using various types of Mobile Stations (MSs) in indoor/outdoor stationary environments and mobile environments at pedestrian speed and medium/low speed (of about 60 Km/h).

On the other hand, active research is being conducted to provide users with various classes of Quality of Service (QoS) in the above-described wireless communication system. A high-speed, high-capacity communication system is required which can process and transmit various types of information such as video data, wireless data, and the like beyond a voice-centric service. Thus, in the wireless communication system, a channel coding scheme proper for increasing system transmission efficiency and improving system performance is essential.

However, inevitable error and information loss may occur due to many factors such as multipath interference, shadowing, propagation attenuation, time variant noise and interference fading in wireless channel environments of the wireless communication systems which are different from wired channel environments. An actual transmitted signal may be significantly distorted due to the information loss. This distortion may be a factor degrading the overall performance of a wireless communication system.

As described above, an interfering signal may be generated in the wireless communication system. The interfering signal significantly affects system performance. For example, a cell edge area can be considered in a system in which a frequency reuse factor is 1. In the cell edge area, there is a signal transmitted from a Base Station (BS), for example, a serving BS, for receiving information from an MS connected thereto and a signal transmitted from a neighbor BS to another user using the same frequency. The signal from the neighbor BS directly interferes with the MS, resulting in the degradation of reception performance of the MS.

Conventionally, a broadband wireless communication system, for example, a cellular Orthogonal Frequency Division Multiplexing (OFDM) based system, employs a frequency reuse factor of 1 in order to improve spectral efficiency and facilitate cell planning. However, in a cell edge overlap area, the MS receives the signal of the serving BS overlapping with the interfering signal of the neighbor BS at similar power levels. Thus, there is a problem in that the link performance of the MS may be significantly degraded due to mutual interference of neighbor BSs.

To overcome this problem, a low code rate and low-order modulation scheme such as Quadrature Phase Shift Keying (QPSK) is used when a signal is transmitted to an MS located in the cell edge area. For example, Forward Error Correction (FEC) and repetition coding can be simultaneously employed for transmission. However, in this case, there is a problem in that spectral efficiency is excessively lowered.

An alternative method is a technology in which the MS detects a target signal by eliminating an interfering signal received from the neighbor BS using an interference cancellation technique. In this case, the complexity of the MS increases since the signal of the neighbor BS is to be demodulated for the interference cancellation. However, this technology is advantageous in that link performance may be significantly improved without degrading spectral efficiency.

FIG. 1 is a schematic diagram illustrating a structure of a receiver using an interference cancellation technique in a conventional wireless communication system.

FIG. 1 illustrates an example of one interfering signal. As illustrated in FIG. 1, there can be provided multiple transmitters 101 and 103, an interference canceller 111, a mixer 113, a channel estimator 115, an equalizer 117, a symbol demapper 119 and a decoder 121.

Referring to FIG. 1, the receiver 110 receives a signal in which a target signal S1 of the transmitter 101, for example, a serving BS, overlaps with an interfering signal S2 of the transmitter 103, for example, a neighbor BS. The receiver 110 first performs channel estimation and equalization on the interfering signal S2 using the interference canceller 111 and then generates signal points on a constellation using a symbol demapper within the interference canceller 111. The symbol demapper indicates an input complex value on a complex plane and generates a predetermined number of signal points.

Then the interference canceller 111 performs multiplication by a channel estimate $h_2$ using the generated signal points and regenerates the interfering signal. The mixer 113 subtracts the interfering signal S2 from the received signal, thereby eliminating the interfering signal S2 from the received signal.

Using a signal obtained by eliminating a component of the interfering signal S2 from the received signal, the receiver 110 performs channel estimation and equalization on the target signal S1 using the channel estimator 115 and the equalizer 117. The symbol demapper 119 and the decoder 121 detect and decode the target signal, thereby demodulating the target signal.

To demodulate an interfering signal in a wireless communication system, for example, an OFDM system, the receiver should know in advance a modulation level of the interfering signal, for example, the presence of the interfering signal and a Modulation and Coding Scheme (MCS) level. Moreover, the receiver should be able to perform channel estimation of a signal received from the neighbor BS using a pilot of the transmitter 103, for example, the neighbor BS.

For conventional channel estimation on the interfering signal received from the neighbor BS as described above, the MS can perform the channel estimation only when knowing in advance a pilot pattern of the neighbor BS. That is, an interference cancellation process is performed based on a design of a system-operating scenario when a modulation level of the interfering signal is assumed to be, for example, QPSK. To conventionally detect the presence of the interfering signal, resource allocation information of the neighbor BS should be known in advance. The resource allocation information can be detected after receiving in advance a signalling channel of the neighbor BS and decoding the received signaling channel.

For the above-described channel estimation, the MS should know in advance the pilot pattern and the presence of the interfering signal from the neighbor BS. However, in this case, there is a problem in that the complexity of the MS may increase and the use of the interference cancellation technique may not be facilitated when the signaling channel itself is received.

SUMMARY OF THE INVENTION

An aspect of the present invention is to address at least the above problems and/or disadvantages and to provide at least the advantages described below. Accordingly, the present invention provides an apparatus and method that can improve the reception performance of a mobile station or base station in a wireless communication system.

An object of the present invention is to provide an interference cancellation apparatus and method that can improve the reception performance of a mobile station or base station in a wireless communication system.

Another object of the present invention is to provide a symbol demapping apparatus and method for efficient interference cancellation in a wireless communication system.

A further object of the present invention is to provide an interference signal cancellation apparatus and method that can detect the presence of an interfering signal in a blind scheme when the interfering signal is detected in a wireless communication system.

A still further object of the present invention is to provide an apparatus and method that can efficiently improve the degradation of reception performance due to incomplete information caused by an interfering signal in a wireless communication system.

An additional object of the present invention is to provide an apparatus and method that can reduce an error propagation effect by efficiently operating an interference canceller regardless of the presence of an interfering signal in a wireless communication system.

In accordance with an aspect of the present invention, there is provided a symbol demapping method for interference cancellation in a wireless communication system, including generating decision signal points including decision signal points based on a modulation scheme and a virtual signal point added to a zero point; comparing a magnitude of a complex value of an input signal with a threshold based on system setting; mapping and outputting the virtual signal point of the zero point as a target decision signal point when the magnitude of the complex value is less than the threshold; and mapping and outputting one of the decision signal points based on the modulation scheme according to the complex value when the magnitude of the complex value is greater than or equal to the threshold.

In accordance with an aspect of the present invention, there is provided a symbol demapping method for interference cancellation in a wireless communication system, including generating decision signal points including decision signal points based on a modulation scheme and a virtual signal point added to a zero point; and mapping and outputting a signal point nearest to a position of an input complex value as a target decision signal point among the decision signal points based on the modulation scheme and the virtual signal point.

In accordance with an aspect the present invention, there is provided a method for interference cancellation in a wireless communication system, including detecting presence of an interfering signal from a received signal; generating decision signal points including a virtual signal point and signal points based on a modulation scheme for the interfering signal upon detecting that the interfering signal is present; selecting a decision signal point mapped to a system setting scheme from among the generated signal points; and eliminating the interfering signal from the received signal after regenerating the interfering signal using the selected decision signal point.

In accordance with an aspect of the present invention, there is provided a receiver for interference cancellation in a wireless communication system, including an interference canceller for generating decision signal points including decision signal points based on a modulation scheme and a virtual signal point added to a zero point and regenerating and outputting an interfering signal for interference cancellation from a received signal, the interference canceller including a symbol demapper for comparing a magnitude of a complex value of the received signal with a threshold based on system setting, mapping and outputting the virtual signal point of the zero point as a target decision signal point when the magnitude of the complex value is less than the threshold, and mapping and outputting one of the decision signal points based on the modulation scheme according to the complex value when the magnitude of the complex value is greater than or equal to the threshold.

In accordance with an aspect of the present invention, there is provided a receiver for interference cancellation in a wireless communication system, including an interference canceller for generating decision signal points including decision signal points based on a modulation scheme and a virtual signal point added to a zero point and regenerating and outputting an interfering signal for interference cancellation from a received signal, the interference canceller including a symbol demapper for mapping and outputting a signal point nearest to a position of an input complex value as a target decision signal point among the decision signal points based on the modulation scheme and the virtual signal point.

BRIEF DESCRIPTION OF THE DRAWINGS

The above and other features and advantages of the present invention will be more apparent from the following detailed description taken in conjunction with the accompanying drawings, in which.

DETAILED DESCRIPTION OF PREFERRED EMBODIMENTS

Preferred embodiments of the present invention will be described in detail herein below with reference to the accompanying drawings. Descriptions of well-known functions and constructions are omitted for clarity and conciseness. The detailed construction and elements are provided to assist in a comprehensive understanding of exemplary embodiments of the invention. Those of ordinary skill in the art will recognize that various equivalents and modifications of the embodiments described herein can be made at the time of filing the application.

The present invention provides an apparatus and method for eliminating an interfering signal in a wireless communication system. In particular, the present invention provides an interference cancellation scheme for improving the reception performance of a Mobile Station (MS) or Base Station (BS) in a wireless cellular communication system.

When an interfering signal is detected in the present invention, the presence of the interfering signal is detected in a blind scheme and the detected interfering signal can be reflected in an interference cancellation process. Thus the present invention can reduce the occurrence of incomplete information due to the interfering signal, thereby efficiently improving the degradation of reception performance.

That is, in the present invention, a symbol demapper within an interference canceller can insert a virtual decision signal point corresponding to a zero point and can enable a robust operation in the interference canceller regardless of the presence of the interfering signal. An error propagation effect can be suppressed by disabling an interference cancellation operation on an interfering signal whose reliability is low even when the interfering signal is present.

Figure 1:
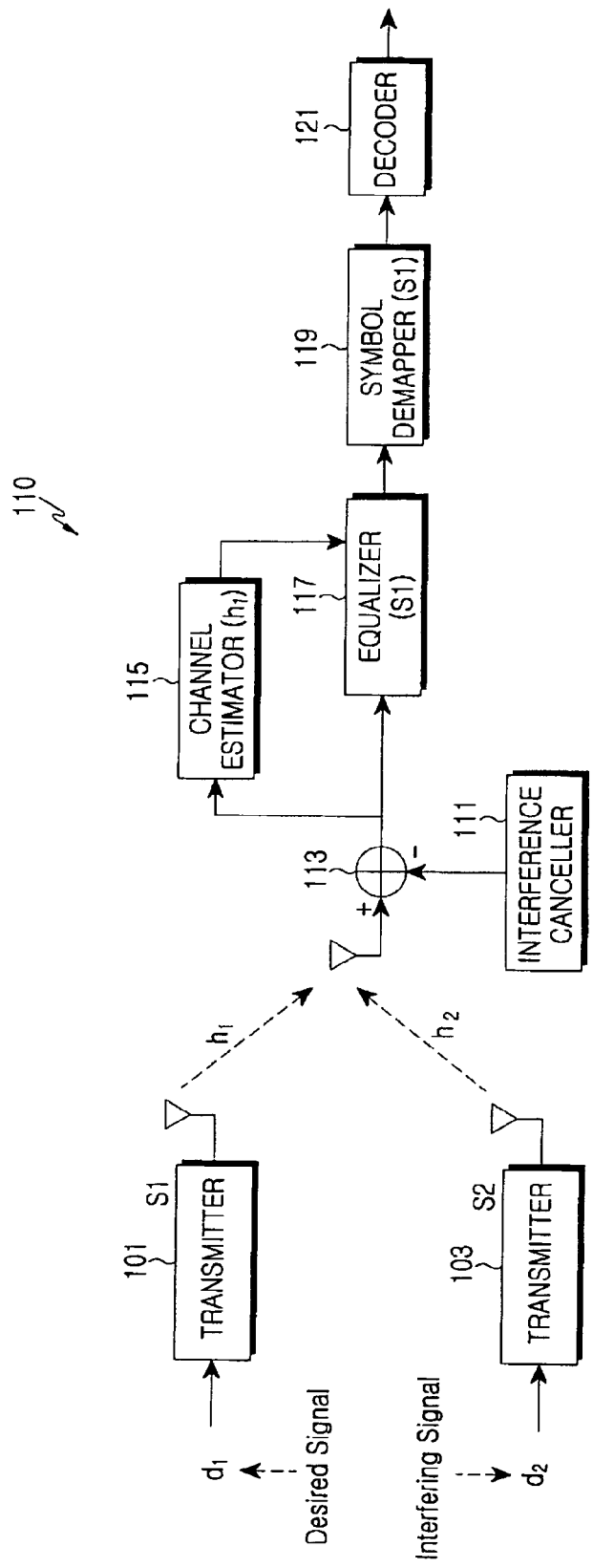
FIG. 1 is a schematic diagram illustrating a structure of a receiver using an interference cancellation technique in a conventional wireless communication system.
Figure 2:
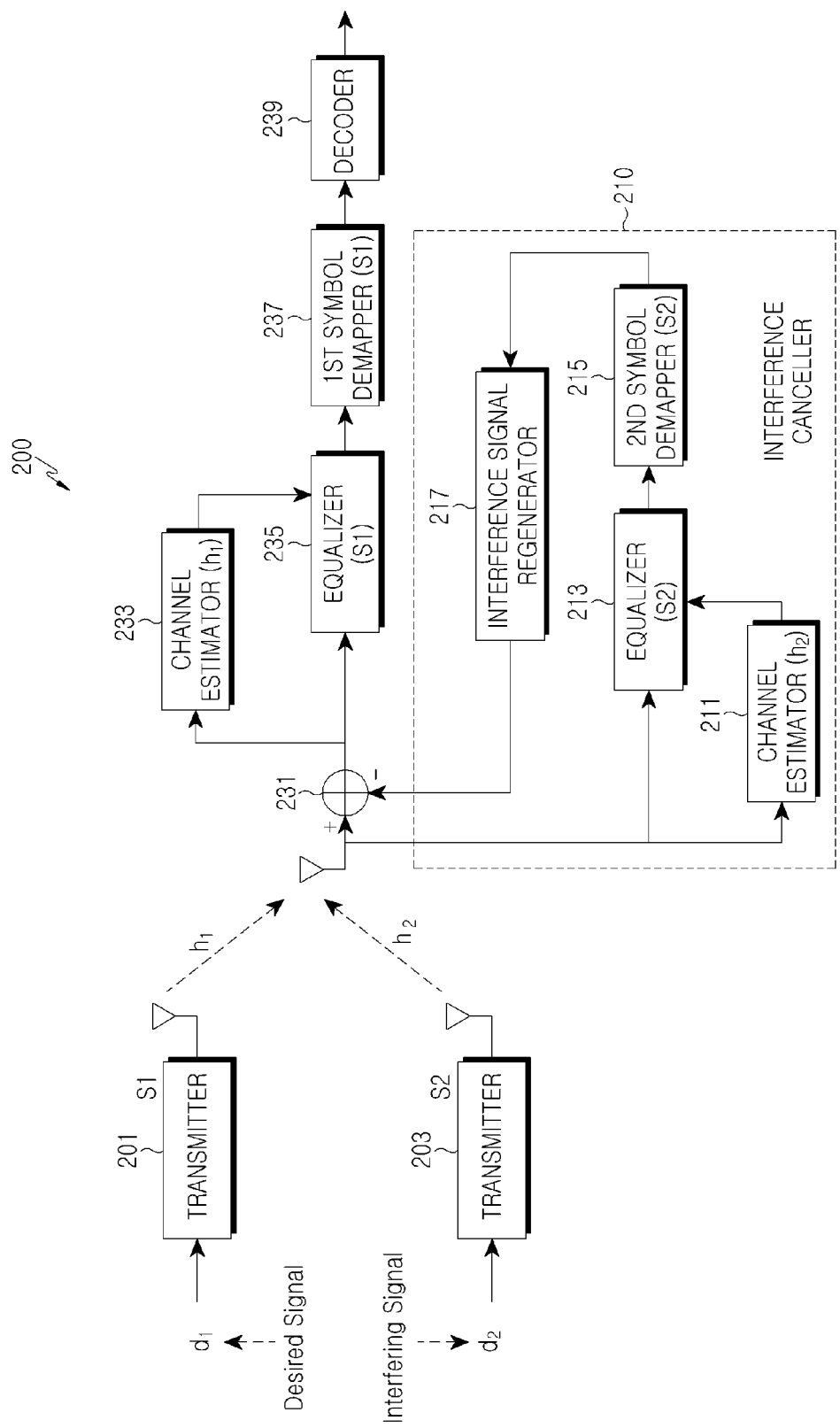
FIG. 2 is a schematic diagram illustrating a structure of a receiver in a wireless communication system in accordance with the present invention.

FIG. 2 is a schematic diagram illustrating a structure of a receiver in a wireless communication system in accordance with the present invention.

An example of one interfering signal is illustrated in FIG. 2. However, the present invention is not limited to the example of one interfering signal. For example, the present invention can be extended and applied also to the case where the number of interfering signals is M. The receiver of FIG. 2 can be provided in any MS or BS.

As illustrated in FIG. 2, the receiver 200 can be constructed with transmitters 201 and 203, an interference canceller 210, a mixer 231, a channel estimator 233, an equalizer 235, a first symbol demapper 237 and a decoder 239. The interference canceller 210 can be constructed with a channel estimator 211, an equalizer 213, a second symbol demapper 215 and an interference signal regenerator 217.

Referring to FIG. 2, the receiver 200 receives a signal in which a target signal S1 of the transmitter 201, for example, a serving BS, overlaps with an interfering signal S2 of the transmitter 203, for example, a neighbor BS. In the interference canceller 210 of the receiver 200, the channel estimator 211 performs channel estimation $h_2$ on the interfering signal S2 of the transmitter 203, and the equalizer 213 performs channel equalization on the interfering signal S2. The second symbol demapper 215 detects the presence of the interfering signal and then generates signal points on a constellation according to the detection. That is, the second symbol demapper 215 can indicate an input complex value on a complex plane and can generate a predetermined number of signal points. For example, when a modulation level is Quadrature Phase Shift Keying (QPSK), five signal points can be generated which include four decision signal points and a virtual signal point corresponding to a zero point on the constellation.

In the interference canceller 210, the interference signal regenerator 217 performs multiplication by a channel estimate $h_2$ using the generated signal points including the virtual signal point and regenerates the interfering signal. The regenerated interfering signal is output to the mixer 231. In the receiver 200, the mixer 231 subtracts the interfering signal S2 from the received signal, thereby eliminating the interfering signal S2 from the received signal.

In the receiver 200, the channel estimator 233 performs channel estimation $h_1$ on the true target signal S1 from which a component of the interfering signal S2 has been eliminated and the equalizer 235 performs channel equalization on the target signal S1. Then the first symbol demapper 237 detects the target signal S1. Then the decoder 239 decodes the detected target signal S1, thereby demodulating the target signal transmitted from the transmitter 201.

The structure of the receiver in accordance with the present invention as described above is analogous to that of a conventional receiver. However, the structure of the interference canceller 210 is different from that of the conventional receiver. That is, the conventional receiver includes a symbol demapper that performs an operation analogous to that of the symbol demapper for detecting the interfering signal S2 in the interference canceller 210. However, in accordance with the present invention, the receiver 200 includes the second symbol demapper 215 of a modified form, different from the first symbol demapper 237 for detecting the target signal S1, in the interference canceller 210. That is, in accordance with the present invention, the second symbol demapper 215 detects the presence of the interfering signal S2 in the blind scheme when the interfering signal S2 is detected.

Next the conventional symbol demapper and the second symbol demapper in accordance with the present invention will be described with reference to FIGS. 3 and 4, for example, when a modulation level is QPSK.

Figure 3:
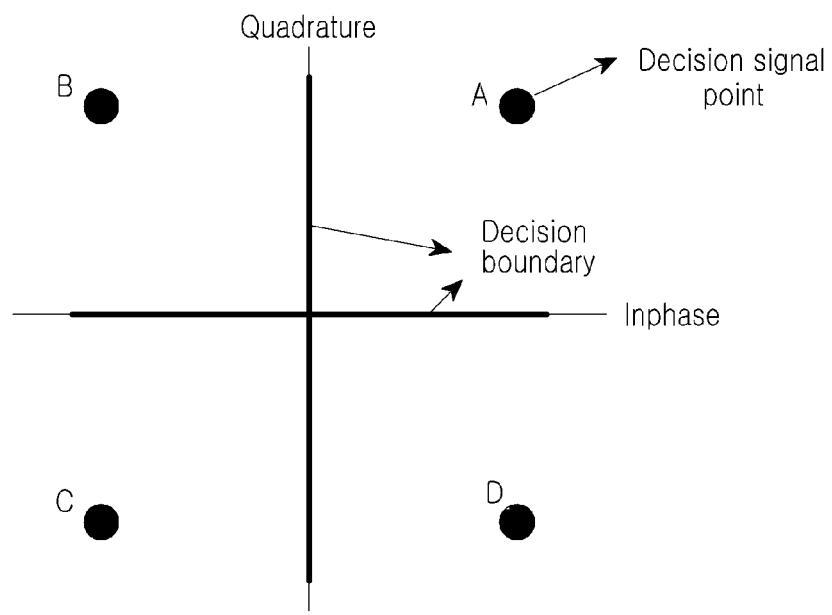
FIG. 3 illustrates an operation of a symbol demapper in the conventional wireless communication system.

FIG. 3 illustrates the operation of the symbol demapper in the conventional wireless communication system. In particular, FIG. 3 illustrates an example in which the symbol demapper generates signal points on the constellation when the modulation level is QPSK.

As illustrated in FIG. 3, the conventional receiver maps a signal point of a received signal to one of four decision signal points, for example, a decision signal point A positioned in the first quadrant, a decision signal point B positioned in the second quadrant, a decision signal point C positioned in the third quadrant and a decision signal point D positioned in the fourth quadrant, by performing slicing based on a decision boundary. That is, a complex value input to the symbol demapper is indicated on the complex plane. When the complex value is in a position (+1 +j) of the first quadrant, the decision signal point A is output. When the complex value is in a position (−1 +j) of the second quadrant, the decision signal point B is output. When the complex value is in a position (−1 −j) of the third quadrant, the decision signal point C is output. When the complex value is in a position (+1 −j) of the fourth quadrant, the decision signal point D is output.

Figure 4:
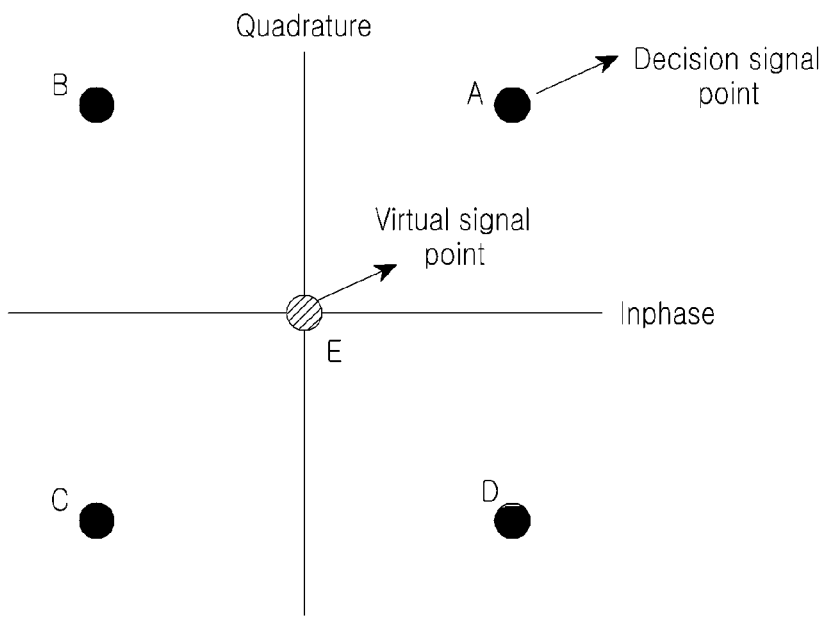
FIG. 4 illustrates an operation of a symbol demapper in the wireless communication system in accordance with the present invention.

FIG. 4 illustrates the operation of the symbol demapper in the wireless communication system in accordance with the present invention. In particular, FIG. 4 illustrates an example in which the symbol demapper generates signal points on the constellation when the modulation level is QPSK.

The conventional symbol demapper uses four decision signal points A, B, C and D for slicing in QPSK as illustrated in FIG. 3. However, the symbol demapper in accordance with the present invention as illustrated in FIG. 4 uses five decision signal points including a virtual signal point E added to a zero point, for example, a decision signal point A positioned in the first quadrant, a decision signal point B positioned in the second quadrant, a decision signal point C positioned in the third quadrant, a decision signal point D positioned in the fourth quadrant and the virtual signal point of the zero point.

In the symbol demapper within the interference canceller, the signal point (0) can be output in addition to four signal points (+1 +j), (−1 +j), (−1 −j) and (+1 −j). When the signal point (0) is output, an actual interference cancellation operation is disabled. According to the presence of an interfering signal in the present invention or when the reliability of decision of the interfering signal is low, the symbol demapper performs slicing based on the virtual signal point and disables the interference cancellation operation, such that the interference cancellation can be efficiently performed.

Figure 5A:
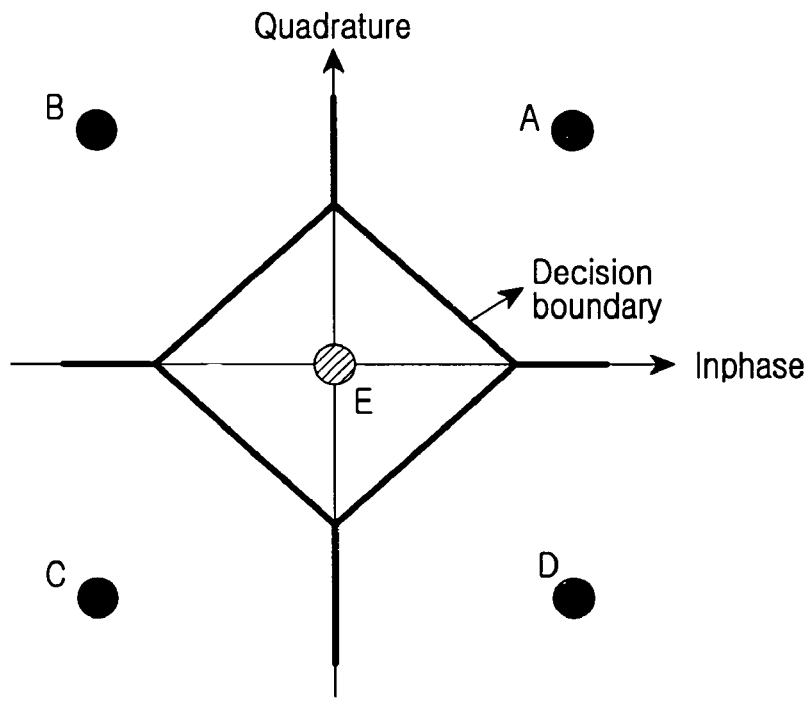
FIGS. 5A and 5B illustrate examples of decision boundaries of the symbol demapper in the receiver in accordance with the present invention.
Figure 5B:
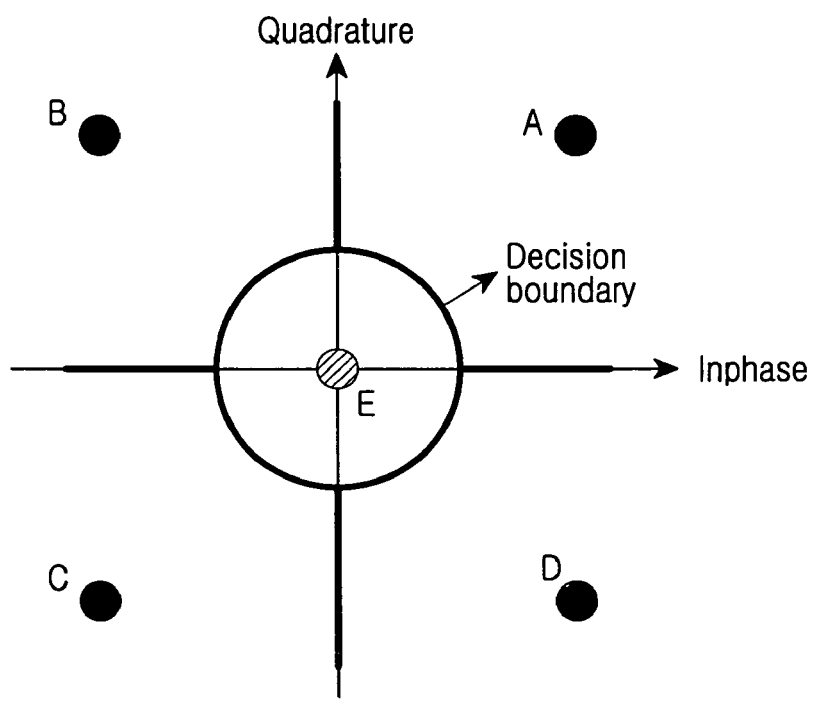

FIGS. 5A and 5B illustrate examples of decision boundaries of the symbol demapper in the receiver in accordance with the present invention. In particular, FIGS. 5A and 5B illustrate examples of decision boundaries of the second symbol demapper when the modulation level is QPSK.

FIG. 5A illustrates a decision boundary for selecting a signal point nearest to an input signal of the second symbol demapper from among five decision signal points in a nearest neighbor rule in accordance with the present invention.

In accordance with the present invention as illustrated in FIG. 5B, the second symbol demapper sets a virtual signal point E to a decision signal point when the magnitude of an input complex value is less than a threshold. The second symbol demapper operates like the conventional symbol demapper when the magnitude of the input complex value is greater than or equal to the threshold. For example, the threshold can be set to be less than the smallest magnitude, that is, the magnitude of a minimum signal point of the decision signal points. In a typical example, the threshold can be set to be half the magnitude of the minimum signal point.

A method as illustrated in FIG. 5B has superior performance and lower complexity than the conventional method. There may be preferably used a method for comparing the magnitude of an input complex value of the symbol demapper with a threshold based on system setting and outputting a decision signal point based on a comparison result.

An example in which the modulation level is QPSK has been described above. However, the present invention is not limited to QPSK. As described above, the virtual signal point can be applied to higher-order modulation, for example, 8-Phase Shift Keying (8 PSK), 16-Quadrature Amplitude Modulation (16 QAM), 64 QAM, and the like. An example of higher-order modulation will be described with reference to FIGS. 6A and 6B.

Figure 6A:
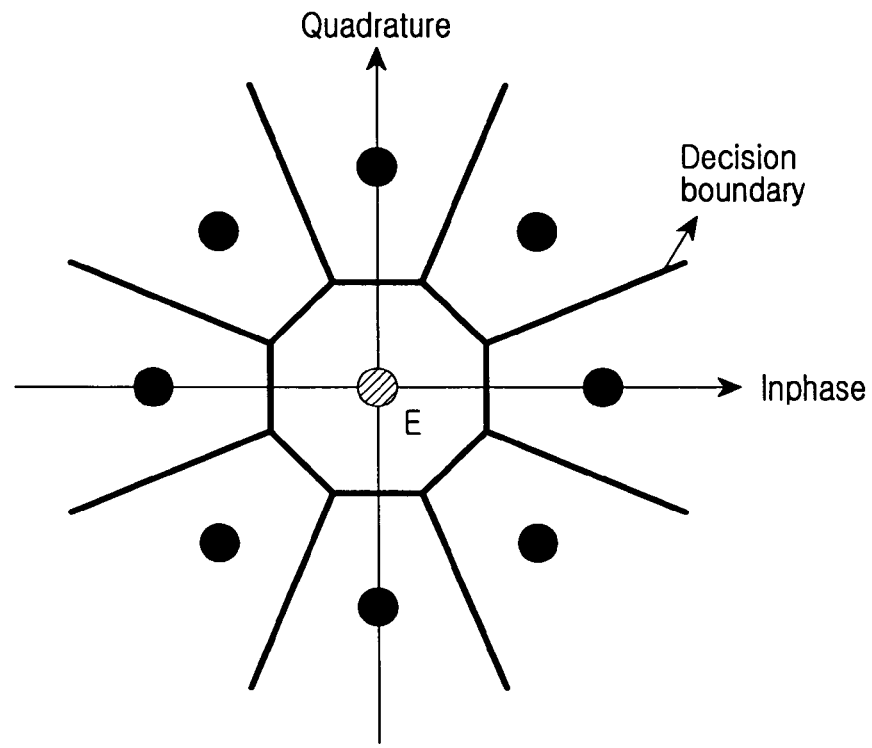
FIGS. 6A and 6B illustrate examples of decision boundaries of the symbol demapper in the receiver in accordance with another embodiment of the present invention.
Figure 6B:
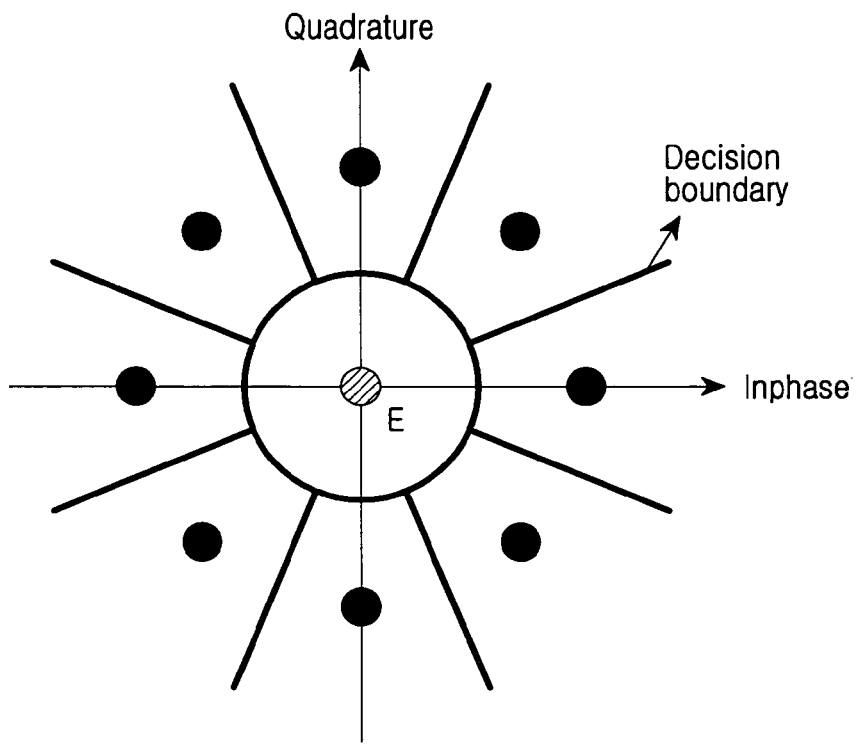

FIGS. 6A and 6B illustrate examples of decision boundaries of the symbol demapper in the receiver in accordance with another embodiment of the present invention. In particular, FIGS. 6A and 6B illustrate examples of decision boundaries of the second symbol demapper when the modulation level is 8 PSK.

FIG. 6A illustrates a decision boundary for selecting a signal point nearest to an input signal of the second symbol demapper from among nine decision signal points in accordance with the present invention.

In accordance with the present invention as illustrated in FIG. 6B, the second symbol demapper sets a virtual signal point E to a decision signal point when the magnitude of an input complex value is less than a threshold. The second symbol demapper operates like the conventional symbol demapper when the magnitude of the input complex value is greater than or equal to the threshold.

Figure 7:
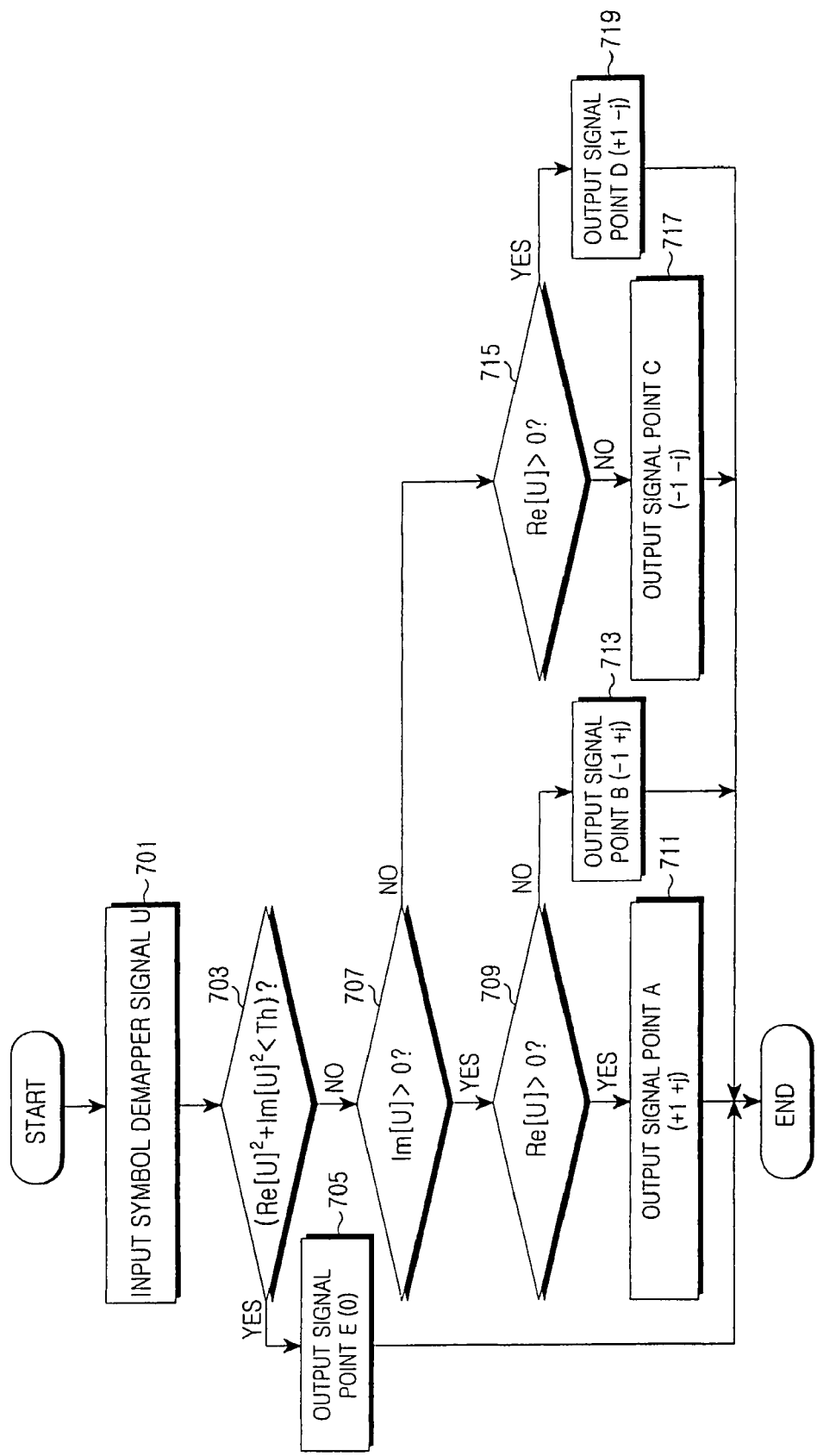
FIG. 7 is a flowchart illustrating a symbol demapping procedure for interference cancellation in the wireless communication system in accordance with the present invention.

FIG. 7 is a flowchart illustrating a symbol demapping procedure for interference cancellation in the wireless communication system in accordance with the present invention.

Referring to FIG. 7, the symbol demapper generates a predetermined input signal U, that is, an input complex value, in step 701 and then proceeds to step 703. The symbol demapper compares the magnitude $Re[U]^2+Im[U]^2$ of the input complex value with a predetermined threshold Th based on system setting in step 703.

When the magnitude of the input complex value is less than the threshold in a comparison result, the symbol demapping procedure proceeds to step 705 to output a virtual signal point E of a zero point as a decision signal point.

When the magnitude of the input complex value is greater than or equal to the threshold in the comparison result, one of four signal points A, B, C and D positioned in the first to fourth quadrants of the complex plane is output in steps 707 to 719.

In detail, when the input complex value is determined to be positioned in the first quadrant ($Im[U]>0$, $Re[U]>0$) in steps 707 and 709, the symbol demapping procedure proceeds to step 711 to output a decision signal point A (+1 +j).

When the input complex value is determined to be positioned in the second quadrant ($Im[U]>0$, $Re[U]<0$) in steps 707 and 709, the symbol demapping procedure proceeds to step 713 to output a decision signal point B (−1 +j).

When the input complex value is determined to be positioned in the third quadrant ($Im[U]<0$, $Re[U]<0$) in steps 707 and 715, the symbol demapping procedure proceeds to step 717 to output a decision signal point C (−1 −j).

When the input complex value is determined to be positioned in the fourth quadrant ($Im[U]<0$, $Re[U]>0$) in steps 707 and 715, the symbol demapping procedure proceeds to step 719 to output a decision signal point D (+1 −j).

As is apparent from the above description, the present invention provides an interference cancellation apparatus and method that can increase the reception performance of an MS or BS in a wireless communication system. Moreover, the present invention can efficiently improve the degradation of reception performance due to incomplete information caused by an interfering signal in the wireless communication system. In the present invention, a symbol demapper within an interference canceller can insert a virtual decision signal point corresponding to a zero point and can enable a robust operation in the interference canceller regardless of the presence of the interfering signal. An error propagation effect can be suppressed by disabling an interference cancellation operation on an interfering signal whose reliability is low even when the interfering signal is present.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A symbol demapping method for interference cancellation in a wireless communication system, comprising:
    generating decision signal points including decision signal points based on a modulation scheme and a virtual signal point added to a zero point;
    comparing a magnitude of a complex value of an input signal with a threshold based on a system setting;
    mapping and outputting the virtual signal point of the zero point as a target decision signal point when the magnitude of the complex value is less than the threshold; and
    mapping and outputting one of the decision signal points based on the modulation scheme according to the complex value when the magnitude of the complex value is greater than or equal to the threshold;
    wherein the threshold is set to half a magnitude of a minimum signal point of the decision signal points.

2. A method for interference cancellation in a wireless communication system, comprising:
    detecting presence of an interfering signal from a received signal;
    generating decision signal points including a virtual signal point and signal points based on a modulation scheme for the interfering signal upon detecting that the interfering signal is present;
    selecting one of the decision signal points in accordance with a system setting scheme; and
    eliminating the interfering signal from the received signal after regenerating the interfering signal using the selected decision signal point;
    wherein selecting one of the decision signal points comprises:
    comparing a magnitude of a complex value of the received signal with a threshold based on system setting;
    mapping and outputting the virtual signal point of a zero point as the decision signal point when the magnitude of the complex value is less than the threshold; and
    mapping and outputting one of the signal points based on the modulation scheme according to the complex value when the magnitude of the complex value is greater than or equal to the threshold;
    wherein the threshold is set to half a magnitude of a minimum signal point of the decision signal points.

3. The method of claim 2, wherein selecting one of the decision signal points comprises:
    mapping and outputting a signal point nearest to a position of the complex value.

4. A receiver for interference cancellation in a wireless communication system, comprising:
    an interference canceller for generating decision signal points including decision signal points based on a modulation scheme and a virtual signal point added to a zero point and regenerating and outputting an interfering signal for interference cancellation from a received signal, the interference canceller comprising:
    a symbol demapper for comparing a magnitude of a complex value of the received signal with a threshold based on a system setting, mapping and outputting the virtual signal point of the zero point as a target decision signal point when the magnitude of the complex value is less than the threshold, and mapping and outputting one of the decision signal points based on the modulation scheme according to the complex value when the magnitude of the complex value is greater than or equal to the threshold;
    wherein the threshold is set to half a magnitude of a minimum signal point of the decision signal points.

5. The receiver of claim 4, wherein the symbol demapper of the interference canceller maps and outputs a signal point nearest to a position of the complex value as the target decision signal point among the decision signal points based on the modulation scheme and the virtual signal point.

6. A receiver for interference cancellation in a wireless communication system, comprising:
    an interference canceller for generating decision signal points including decision signal points based on a modulation scheme and a virtual signal point added to a zero point and regenerating and outputting an interfering signal for interference cancellation from a received signal, the interference canceller comprising:
    a symbol demapper for mapping and outputting a signal point nearest to a position of an input complex value as a target decision signal point among the decision signal points based on the modulation scheme and the virtual signal point
    wherein the symbol demapper of the interference canceller compares a magnitude of the complex value of the received signal with a threshold based on system setting, maps and outputs the virtual signal point of the zero point as the target decision signal point when the magnitude of the complex value is less than the threshold, and maps and outputs one of the decision signal points based on the modulation scheme according to the complex value when the magnitude of the complex value is greater than or equal to the threshold;
    wherein the threshold is set to half a magnitude of a minimum signal point of the decision signal points.

* * * * *